(12) United States Patent
Mack

(10) Patent No.: US 7,841,601 B2
(45) Date of Patent: Nov. 30, 2010

(54) SELF-TIGHTENING DRILL CHUCK

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 873 days.

(21) Appl. No.: 11/728,333

(22) Filed: Mar. 23, 2007

(65) Prior Publication Data

US 2007/0235951 A1 Oct. 11, 2007

(30) Foreign Application Priority Data

Mar. 25, 2006 (DE) .................. 10 2006 013 882
Feb. 16, 2007 (DE) .................. 10 2007 008 314

(51) Int. Cl.
*B23B 31/16* (2006.01)
(52) U.S. Cl. .................. 279/60; 279/140; 279/902
(58) Field of Classification Search ............ 279/60–65, 279/140, 902; *B23B 31/16*
See application file for complete search history.

(56) References Cited

U.S. PATENT DOCUMENTS

| | | | | |
|---|---|---|---|---|
| 3,970,323 A * | 7/1976 | Schnizler, Jr. | ................ | 279/64 |
| 4,302,021 A * | 11/1981 | Rohm | ......................... | 279/60 |
| 5,031,925 A * | 7/1991 | Tatsu et al. | .................... | 279/64 |
| 5,232,230 A * | 8/1993 | Lin | .............................. | 279/62 |
| 5,499,830 A * | 3/1996 | Schnizler | ...................... | 279/62 |
| 7,503,565 B2 * | 3/2009 | Rohm | ......................... | 279/60 |
| 7,726,663 B2 * | 6/2010 | Mack et al. | .................... | 279/60 |
| 7,726,917 B2 * | 6/2010 | Mack | ......................... | 408/124 |
| 2006/0284386 A1 * | 12/2006 | Mack | ......................... | 279/60 |
| 2008/0217869 A1 * | 9/2008 | Mack | ......................... | 279/62 |
| 2009/0058019 A1 * | 3/2009 | Mack | ......................... | 279/114 |

FOREIGN PATENT DOCUMENTS

DE 3713457 C1 * 9/1988
JP 02172605 A * 7/1990

* cited by examiner

*Primary Examiner*—Eric A Gates
(74) *Attorney, Agent, or Firm*—Andrew Wilford

(57) ABSTRACT

A drill chuck has a chuck body centered on and rotatable about an axis, a jaw holder rotatable on the body and formed with a plurality of angularly spaced guides, a sleeve surrounding the holder and body, and jaws in the guides between the sleeve and the body. Interengaging first and second stops on the body engage the sleeve and limit relative angular movement of the sleeve on the body between respective angularly offset first and second end positions. An annular array of teeth rotationally fixed to the chuck body engages first and second pawl angularly fixed on the holder. The pawls and the array of teeth are oriented such that each pawl locks in one direction and ratchets in the other, with the pawls working oppositely. Respective first and second springs urge the first and second pawls into the locking positions.

16 Claims, 19 Drawing Sheets

SELF-TIGHTENING DRILL CHUCK

FIELD OF THE INVENTION

The present invention relates to a chuck. More particularly this invention concerns a self-tightening and -locking drill chuck.

BACKGROUND OF THE INVENTION

A self-tightening drill chuck has a chuck body, a tightening sleeve that can rotate coaxially to the chuck body, and a jaw holder supported on the chuck body in which jaws are guided in guide slots. The jaws can be adjusted by the jaw holder by a relative rotation between the chuck body and the tightening sleeve for tensioning and loosening. A locking device comprises an annular array of teeth coaxial with the chuck axis and a pawl that engages under the force of a spring into the gear ring and is supported on the jaw holder. This locking device locks the chuck body and the first pawl against relative rotations for loosening the jaws when the first pawl has engaged into the teeth but does not hinder relative rotation tightening. A stop formation on the jaw holder and a counter-stop formation on the tightening sleeve limit relative rotation of the tightening sleeve relative to the jaw holder between a first rotational end position corresponding to the engaged state or locking position of the first pawl and to a second rotational position corresponding to the disengaged state or a freeing position. A latch with a seat associated with the first rotational position and with another seat associated with the second rotational position is provided between the jaw holder and the tightening sleeve. This latch does not release rotation of the tightening sleeve relative to the jaw holder at the least in the tightening direction until a predetermined tensioning force has been achieved.

The pawl and teeth are therefore oriented as described in WO 2006/111114 such that the torque applied as a back force against the chuck during normal drilling tends to rotate the sleeve and parts in the tightening direction so that the chuck self tightens. The problem with this type of operation is that the chuck can get so very tight that it is very difficult or impossible to loosen it by hand. The user must get tools to dechuck the tool, typically a drill bit, held by the jaws.

OBJECTS OF THE INVENTION

It is therefore an object of the present invention to provide an improved self-tightening drill chuck.

Another object is the provision of such an improved self-tightening drill chuck that overcomes the above-given disadvantages, in particular that can be set so that it does not overtighten.

SUMMARY OF THE INVENTION

A drill chuck has according to the invention a chuck body centered on and rotatable about an axis, a jaw holder rotatable on the body and formed with a plurality of angularly spaced guides, a sleeve surrounding the holder and body, and jaws in the guides between the sleeve and the body. The jaws shift in the guides forward and together on rotation of the holder in a tightening direction relative to the body and shift oppositely of the jaws on rotation of the holder relative to the body in an opposite loosening direction. Interengaging first and second stops on the body engage the sleeve and limit relative angular movement of the sleeve on the body between respective angularly offset first and second end positions. A detent releasably retains the sleeve in the end positions. An annular array of teeth rotationally fixed to the chuck body engages a first pawl angularly fixed on the holder. The first pawl and the array of teeth are oriented such that when the first pawl is in a locking position engaged with the array of teeth the holder can rotate relative to the body in the tightening direction but not in the loosening direction and when in a freeing position disengaged from the teeth the holder can rotate freely in either direction relative to the body. A second pawl angularly fixed on the holder also engages the teeth. The second pawl and the array of teeth are oriented such that when the second pawl is in a locking position engaged with the array of teeth the holder can rotate relative to the body in the loosening direction but not in the tightening direction and when in a freeing position disengaged from the teeth the holder can rotate freely in either direction relative to the body. Respective first and second springs urge the first and second pawls into the locking positions. Formations of a latch mechanism are provided between the sleeve and the pawls for in the first end position displacing the first pawl into the locking position and the second pawl into the freeing position, in a middle position between the end positions displacing the second pawl into the locking position and the first pawl into the freeing position, and in the second end position displacing both the pawls into the respective freeing positions.

Thus the inventive object is attained in a drill chuck of the type cited in the foregoing in that the jaw holder for limiting the clamping carries a latch mechanism that, when the tightening sleeve is in the middle position between the first rotary position and the second rotary position, is engaged in the teeth and blocks relative rotation of the sleeve in the tightening direction so as to cut out the self-tightening function.

With this drill chuck, moving the tightening sleeve to the middle position activate the second pawl and prevents rotation of the tightening sleeve on the chuck body as a result of the rotary resistance experienced by the clamping jaws when drilling. In this mode, the rotary position of the tightening sleeve relative to the chuck body is established by the combined effect of the detent and the latch mechanism. Handling of the drill chuck is still just as simple because for activating the self-tightening cutout the user merely has to turn the tightening sleeve for a small angle of rotation in the loosening direction in order to reach the appropriate middle rotary position.

For simple operability with reliable functionality, the tightening sleeve has a first control cam for moving the first pawl out of the position in which it is engaged in the teeth into the disengaged position when the tightening sleeve is rotated in the tightening direction. These advantages are also provided with respect to the second pawl in that the tightening sleeve has a second control cam for moving the second pawl out of the position in which it is engaged in the teeth into the position in which it is disengaged from the teeth when the tightening sleeve is rotated out of the middle position into the first end position or into the second end position.

In order to also be able to effectively use the self-tightening cutout to deal with vibrations that occur when drilling, the detent has another seat in which the detent member engages in the middle position.

Also increasing operational safety, the second pawl is activated by the force of another spring that acts in the direction of the engagement of the second pawl in the teeth, that is, the engagement of the second pawl in the teeth does not have to be forced by permanent positioning on the control cam.

For a construction that is simple and cost-effective to produce and assemble, the first and second pawls can be arranged in a plane that is perpendicular to the chuck axis on the jaw holder, in particular in an arrangement opposing one another.

It has provided advantageous when the first and/or the second pawl is formed as a two-armed level with a first lever arm with at least one locking tooth and with a second lever arm for positioning against the first or second control cam so that the distance between the control cams and the teeth is overcome in a simple manner and adequate pressing of the locking tooth against teeth is assured using the lever forces.

It is possible for the spring to act on the first lever arm that has the locking tooth in order thus to utilize the length of the lever arm and to optimize the force acting in the direction of the teeth.

If the tightening sleeve is configured in two parts with a release ring that displaces the first pawl and the second pawl, then the material for the release ring can be selected such that the complex structures of the control cams are produced in a simple and cost-effective manner in that the release ring is produced from plastic in an injection molding process.

There is also the option for the first and second pawls to be in two separate planes on the jaw holder that are perpendicular to the chuck axis in order to distribute forces. The teeth can extend axially until both the first and second pawls can engage therein, that is, only array of teeth must be produced.

However, in a configuration in which first and second arrays of teeth are provided and the first array teeth is associated with the first pawl and the second array with the second pawl and each has a respective angling for attaining the latching action there is the advantage that it is not necessary to make a compromise in terms of the latching action in the two opposing rotary directions with respect to the side incline of the toothed wheel. In other words the one pawl will ratchet in one direction on its teeth and the other pawl in the opposite direction, something easily effected by making the teeth of sawtooth shape.

If the release ring is embodied in two parts, when the one part holds to the first pawl and the other part the second pawl, the user has the freedom to select whether he or she wants to activate the self-tightening cutout by actuating the latch mechanism, even if the latch device is active.

In particular the array or arrays of teeth are formed integrally with the chuck body in order to make production and assembly simple.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
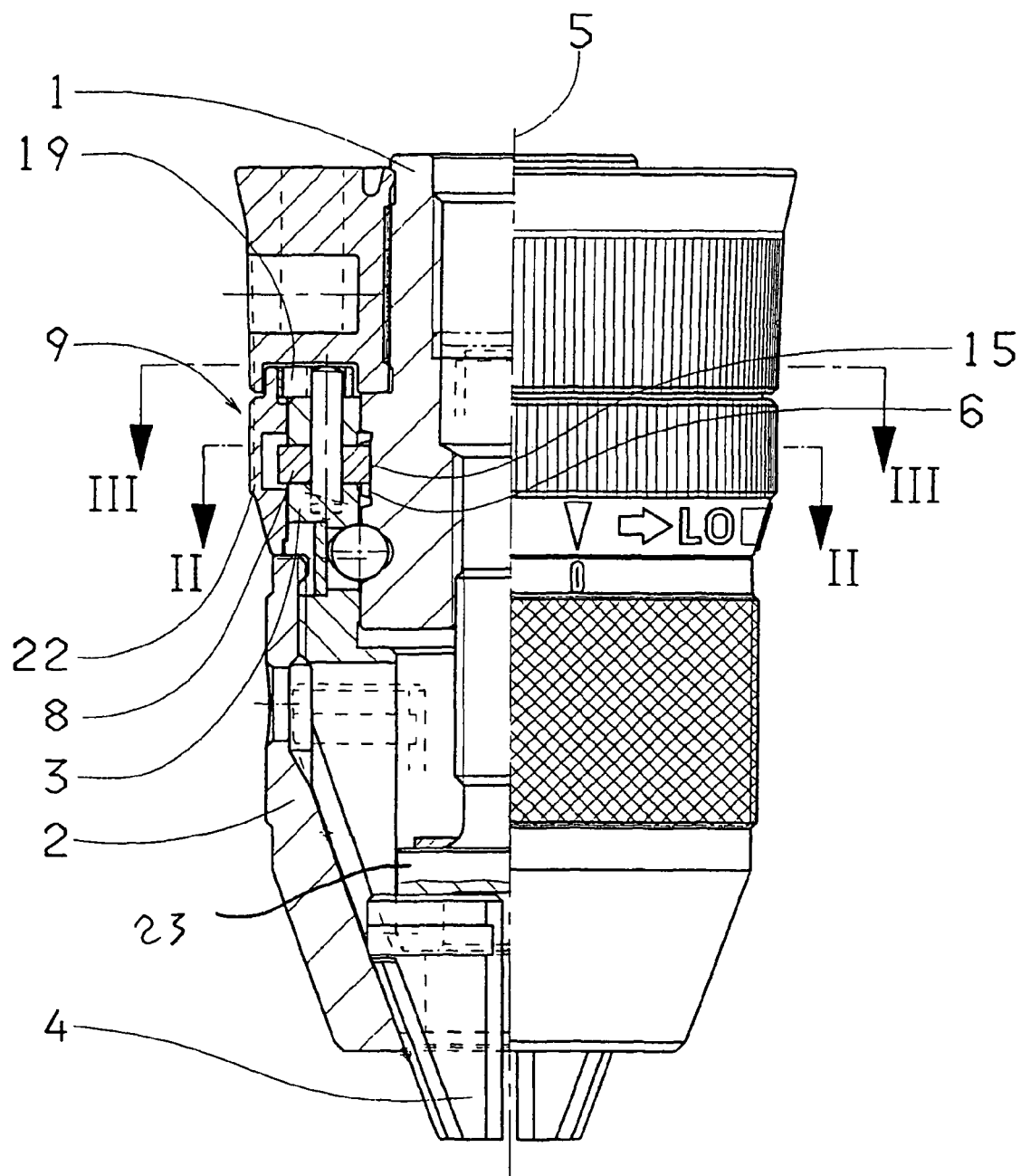
FIG. 1 is a side view partly in axial section through a first embodiment of the chuck according to the invention.

As seen in FIGS. 1, 2A, 2B, 2C, 3A, 3B, and 3C a self-tightening drill chuck has a chuck body 1 centered on and rotatable about an axis 5. A tightening sleeve 2 is axially fixed but rotatable about the axis 5 on the body 1 and is rotationally couplable as described below to a jaw holder 3 rotatable but axially fixed on the body 1 and formed with three angularly equispaced guide slots holding respective jaws 4 that ride on the frustoconical inner surface of the front end of the sleeve 2. A pusher body 23 has a front end formed with seats fitting with rear ends of the jaws 4 and a rear end threaded into the chuck body 1. Thus the holder 3, jaws 4, and pusher 23 are rotationally coupled to each other so that when they are is rotated in one direction the jaws 4 are pushed together and out (down in FIG. 1) for closing/tightening the chuck and when oppositely rotated the jaws 4 move apart and in for opening/loosening the chuck.

Figure 2A:
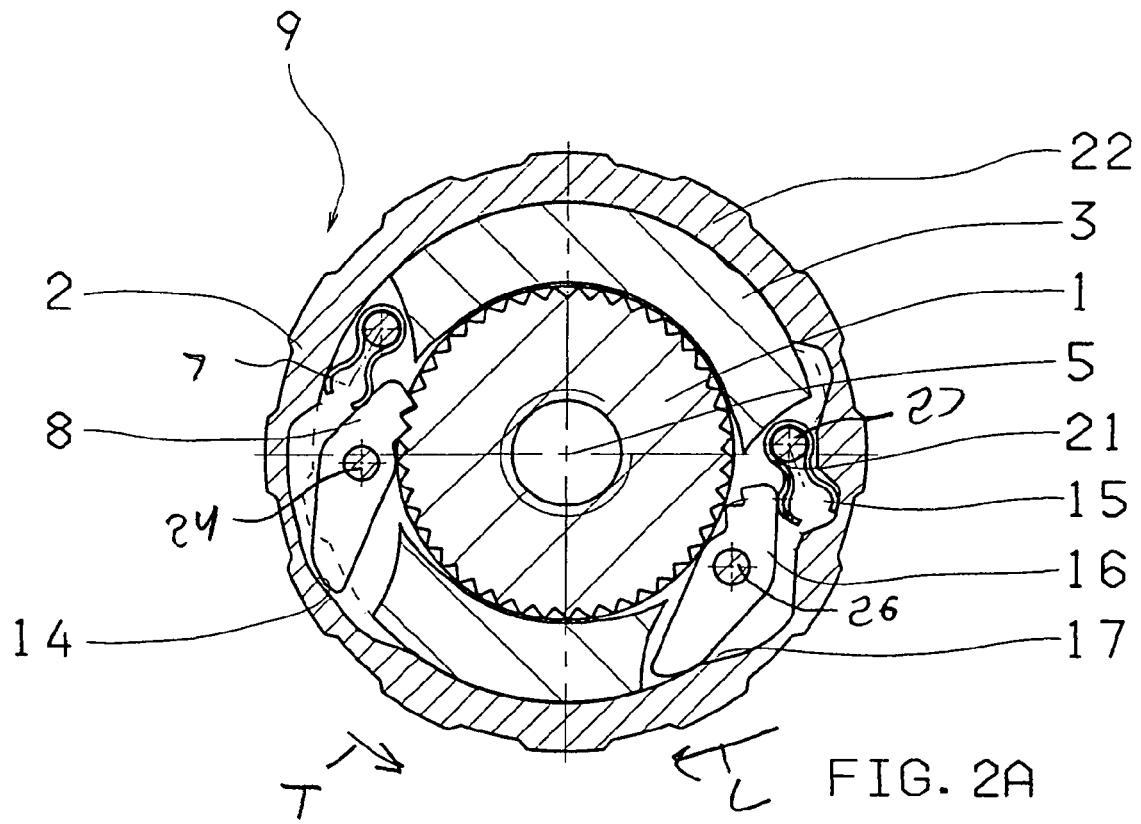
FIG. 2A is a section II-II of FIG. 1 in a first end position with the first pawl in the locking position and the second pawl in the freeing position.
Figure 2B:
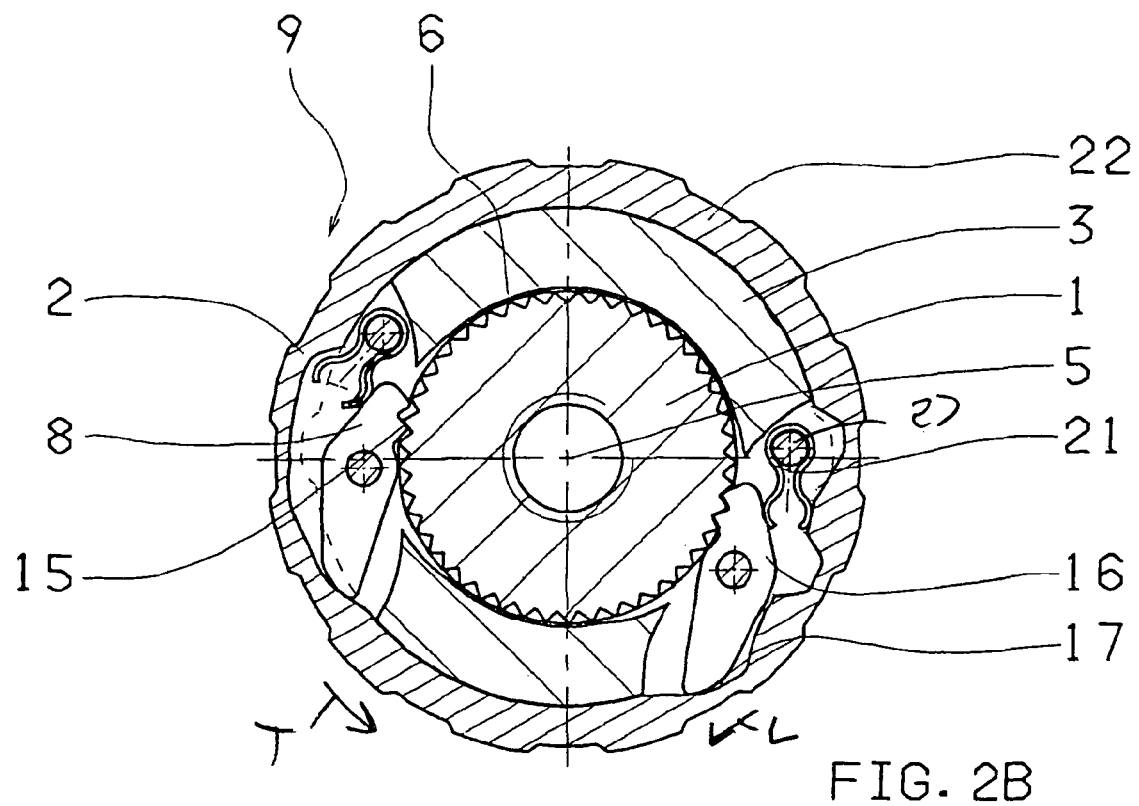
FIG. 2B is a view like FIG. 2A but in a middle position with the first pawl in the freeing position and the second pawl in the locking position.
Figure 2C:
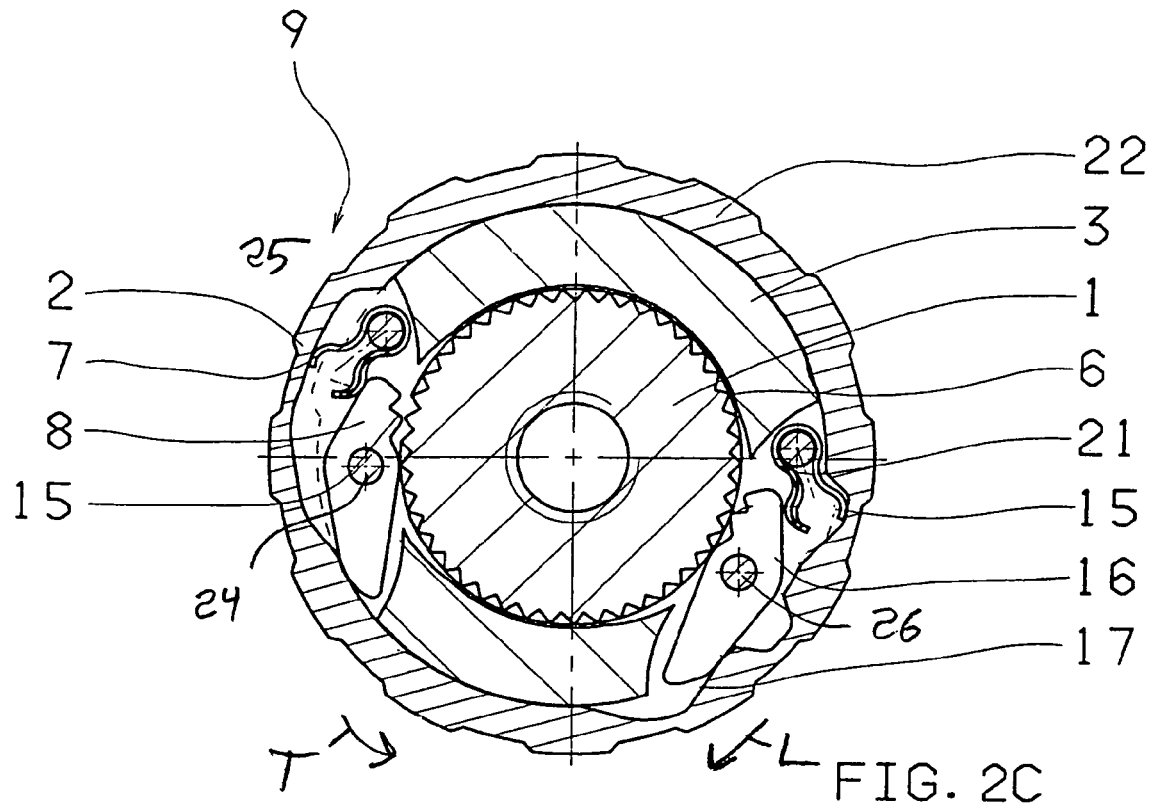
FIG. 2C is a view like FIG. 2A but in a second end position with both pawls in the freeing positions.

The chuck body 1 is formed with an annular array of radially outwardly projecting triangular teeth 6 (FIGS. 2A-2C). A first pawl 8 is pivoted on a pin 24 fixed in the holder 3 and extending parallel to the axis 5. This pawl 8 has one end formed as a tooth and an opposite end engageable in a cam 14 formed as an internal recess in a ring 22 rotationally fixed to the sleeve 2. This sleeve 2 can limitedly rotate about the axis 5 to an extent determined by angularly offset stop faces 11 formed in the sleeve 2 and coating with stops 10 formed by the pin 24 and an adjacent pin 25 (See FIGS. 3*a* and 3C) to limit the angular displacement of the sleeves 2 and 22 on the holder 3 between a first end position shown in FIGS. 2A and 3A and a second end position shown in FIGS. 2C and 3C. In addition a spring 7 mounted on the pin 25 urges the tooth end of the first pawl 8 radially inward to engage between the teeth 6. The interfit of the pawl 8 and teeth 6 and their face angles are such that, when the pawl 8 is in the locking position of FIG. 2A, it prevents rotation of the sleeve 2 relative to the chuck body 1 in a loosening direction L but ratchets and permits such rotation in an opposite tightening direction T.

According to the invention a second pawl 16 substantially identical to the pawl 8 is carried on another pin 26 diametrally opposite and parallel to the pin 24, but oriented oppositely so that when engaged with the teeth 6 it will ratchet in the loosening direction L and lock in the tightening direction T. This pawl 16, like the pawl 8, has two teeth engageable in the teeth 6, and a spring 15 mounted on a pin 27 urges its toothed end radially inward into the locking position. Finally another cam formation 17, of a different shape from the cam 14, acts on the outer end of the pawl 16.

Figure 3A:
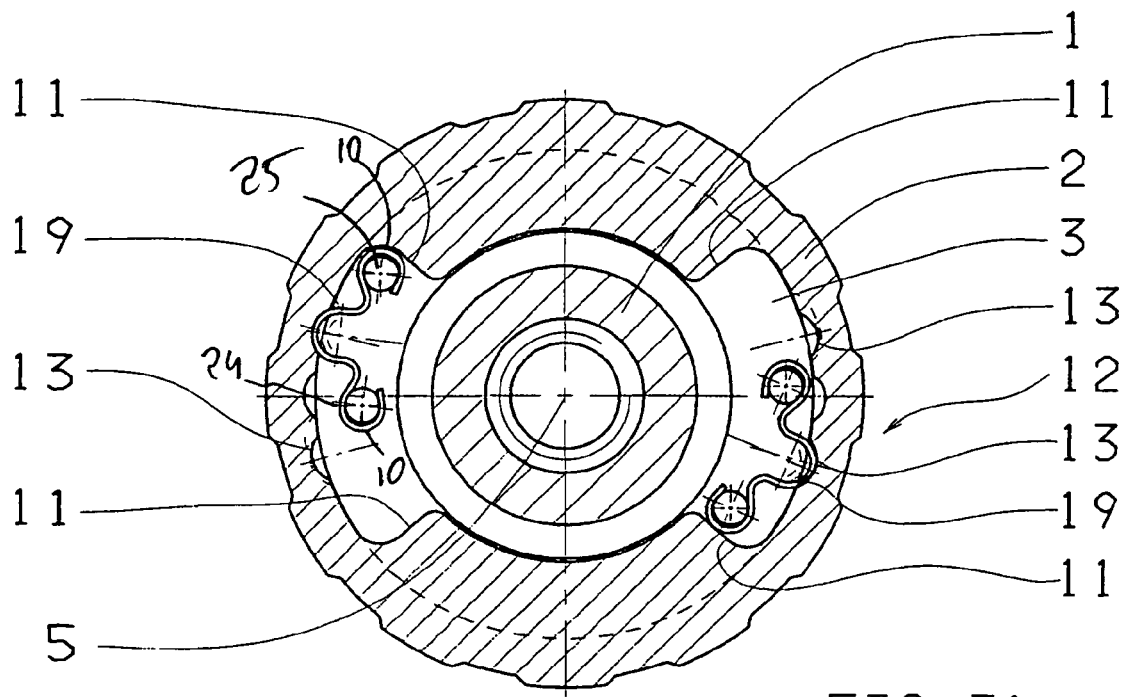
FIG. 3A is section III-III of FIG. 1 in the first end position of FIG. 2A.
Figure 3B:
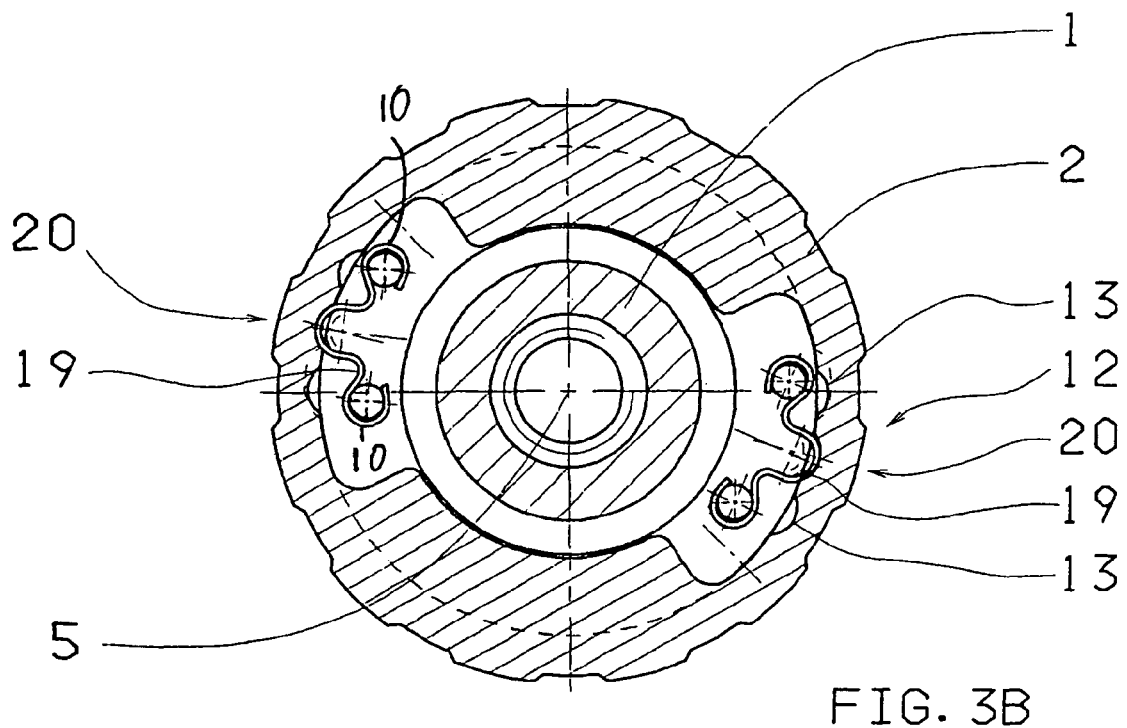
FIG. 3B is a view like FIG. 3A but in the middle position of FIG. 2B.
Figure 3C:
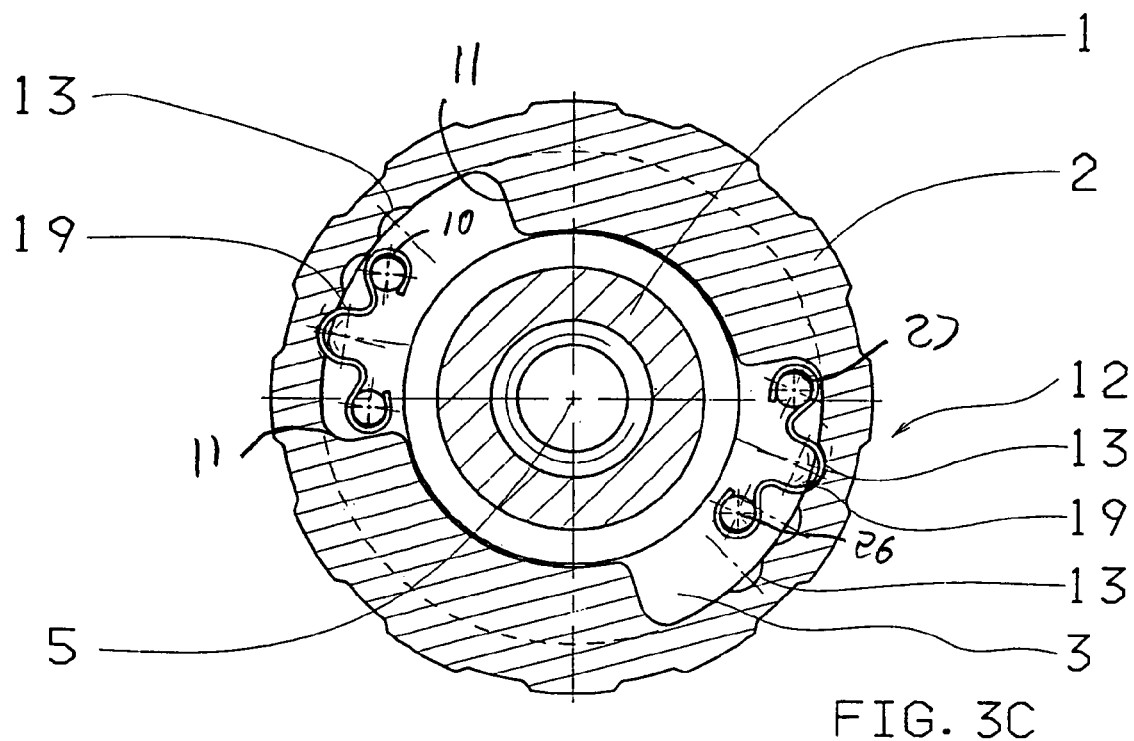
FIG. 3C is a view like FIG. 3a but in the second end position of FIG. 2C.
Figure 4:
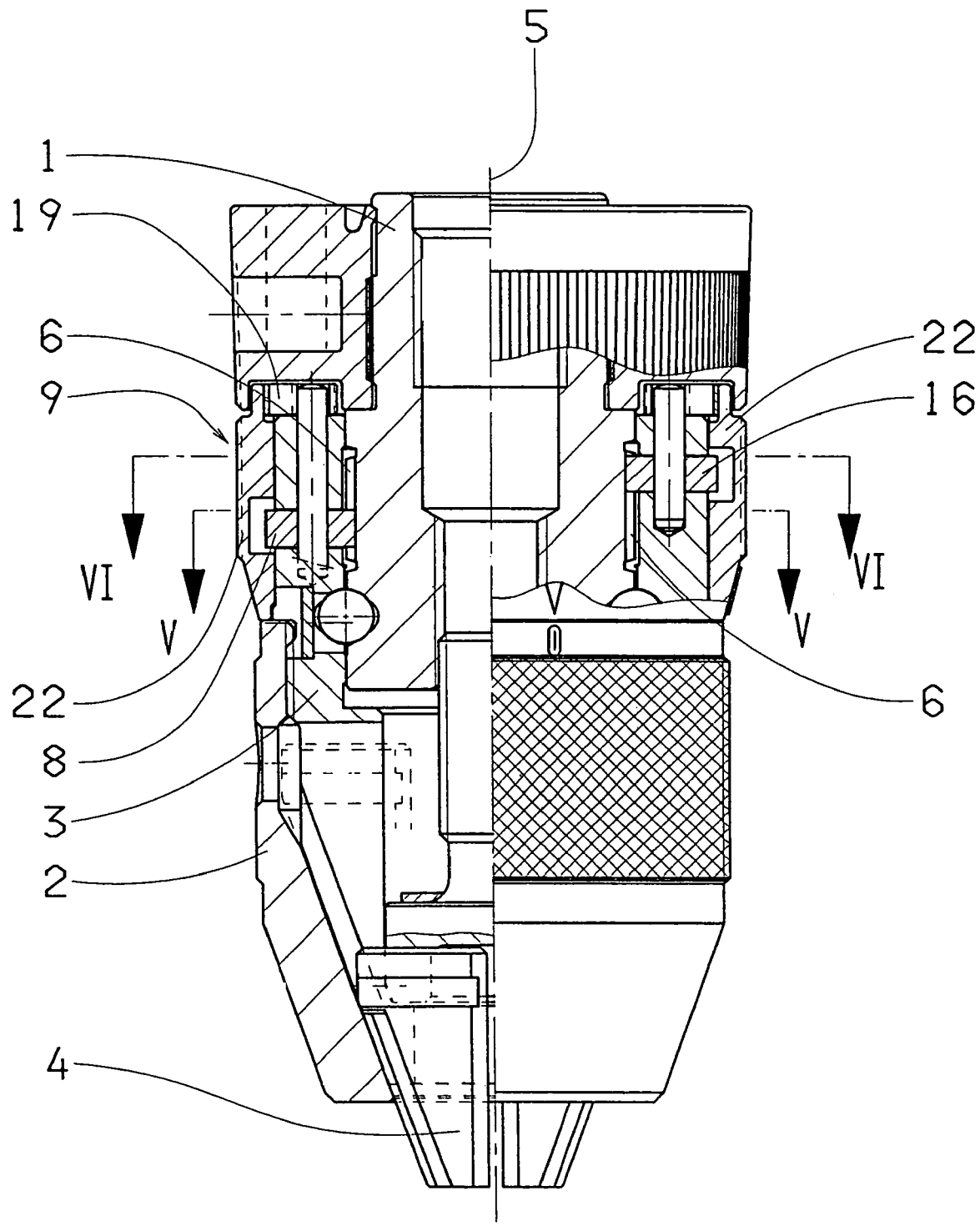
FIG. 4 is a side view partly in axial section through a second embodiment of the chuck according to the invention.
Figure 5A:
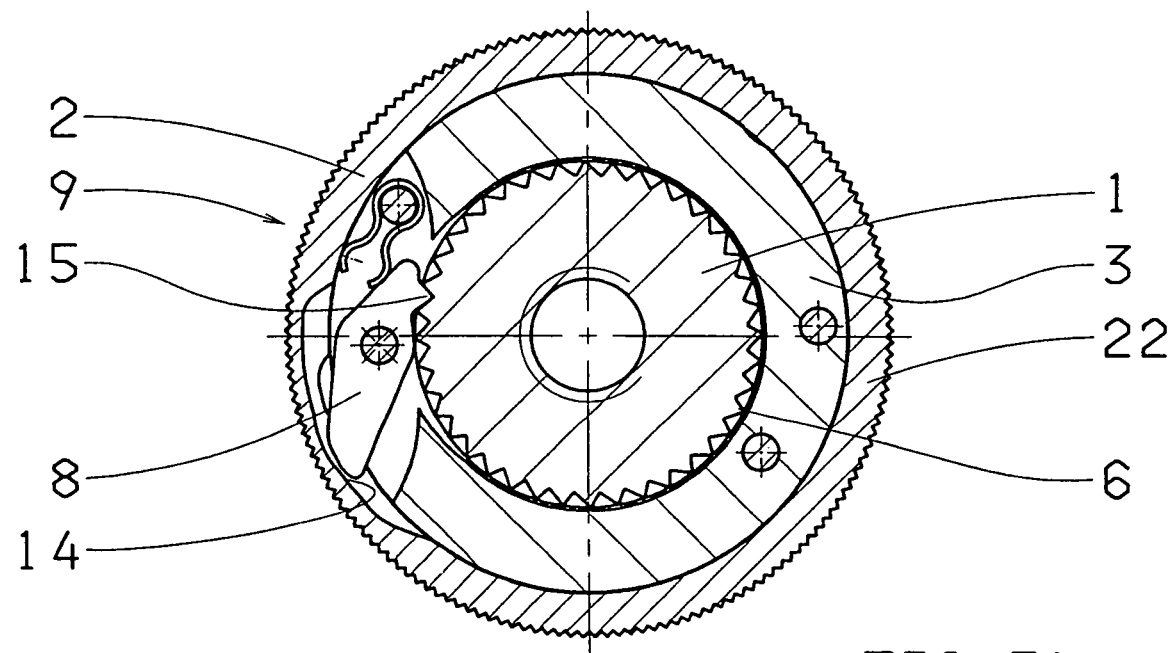
FIGS. 5A and 6A are sections V-V and VI-VI of FIG. 4 in the first end position with the first pawl in the locking position and the second pawl in the freeing position.
Figure 6A:
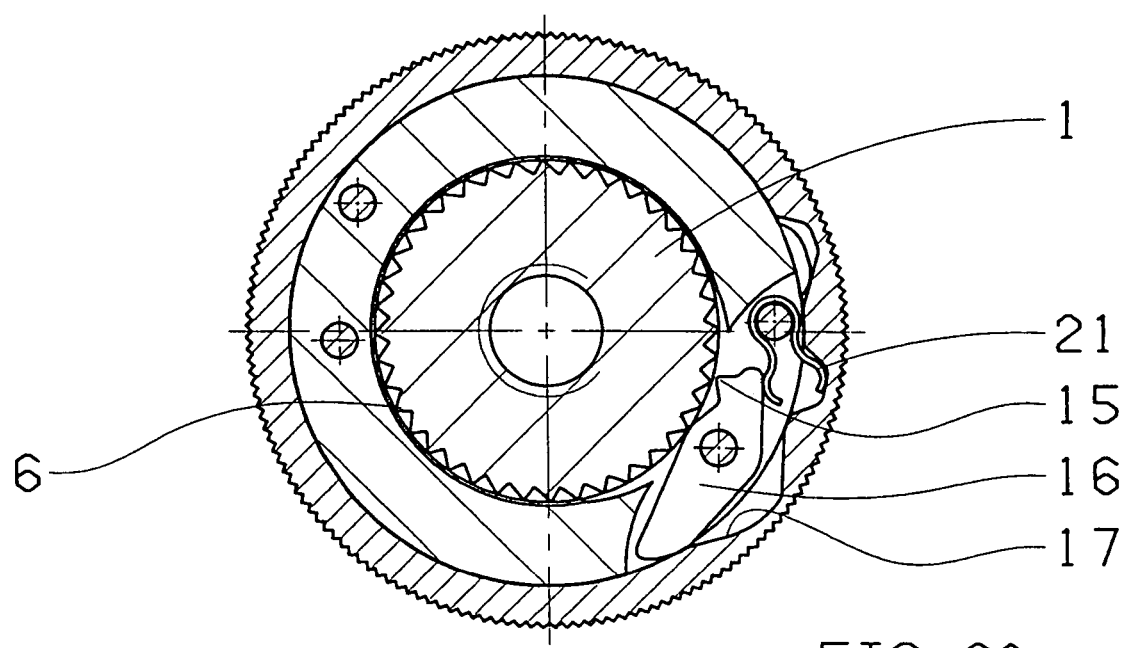
Figure 5B:
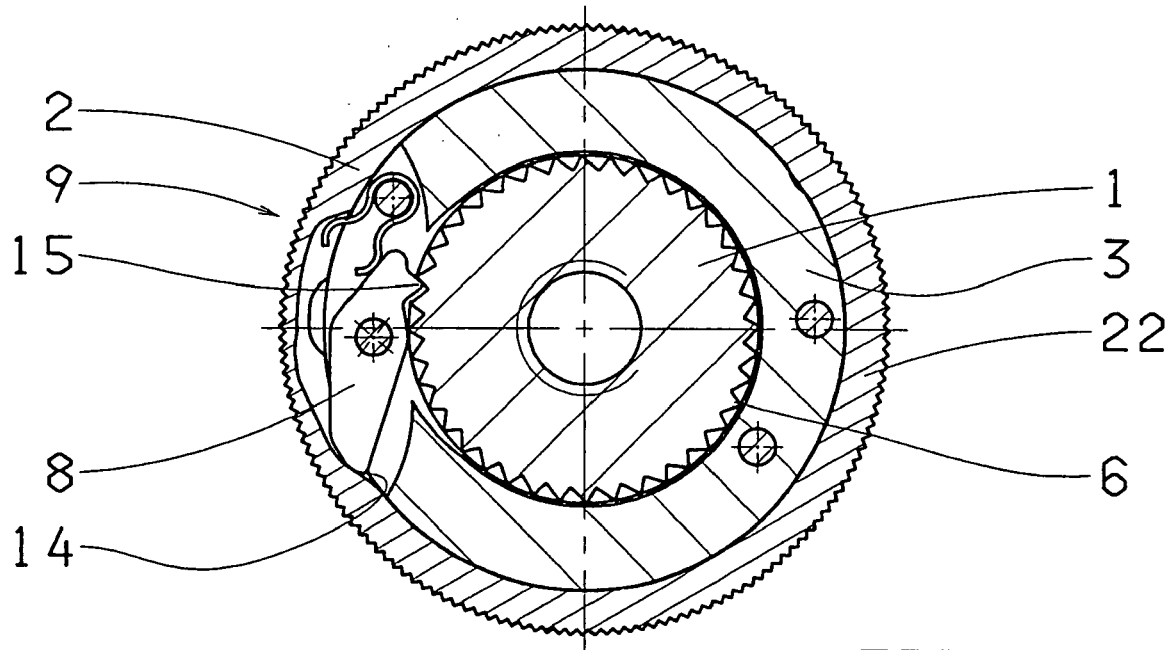
FIGS. 5B and 6B are views like FIGS. 5A and 6A but in the middle position with both pawls in the locking positions.
Figure 6B:
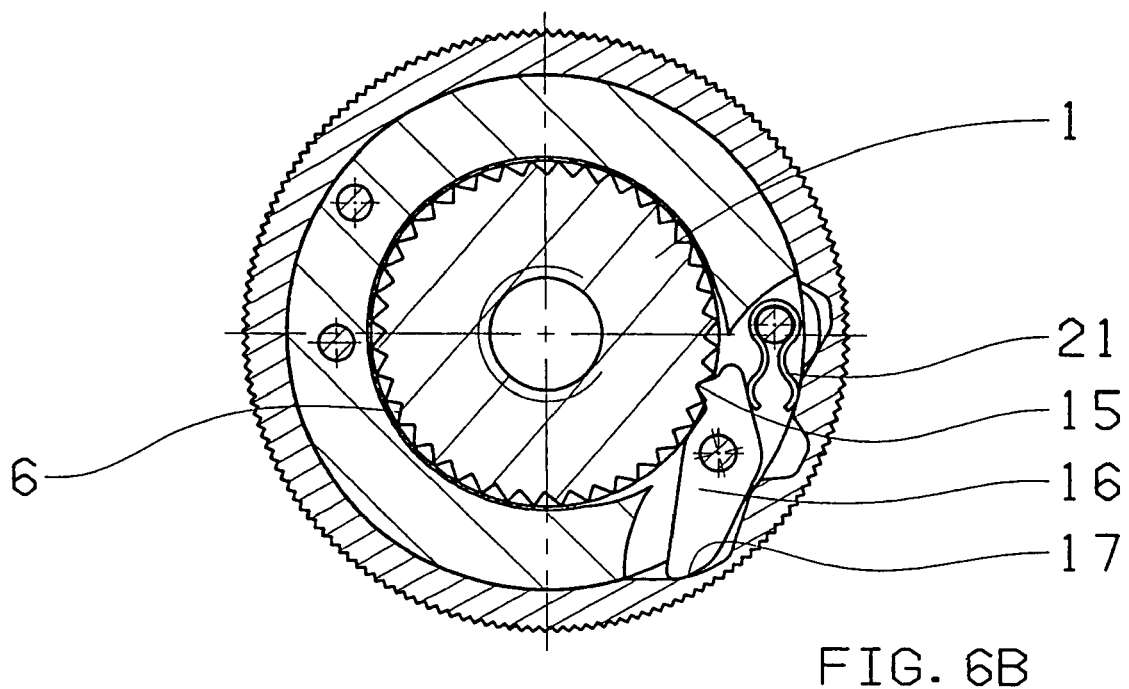
Figure 5C:
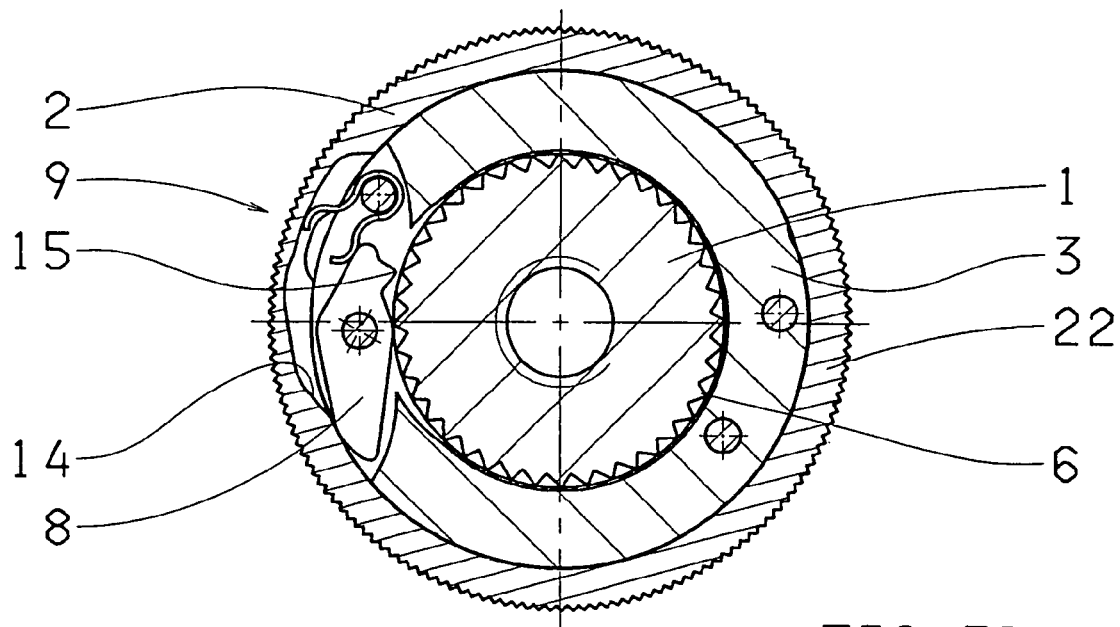
FIGS. 5C and 6C are views like FIGS. 5A and 6A but in the second end position with both pawls in the freeing positions.
Figure 6C:
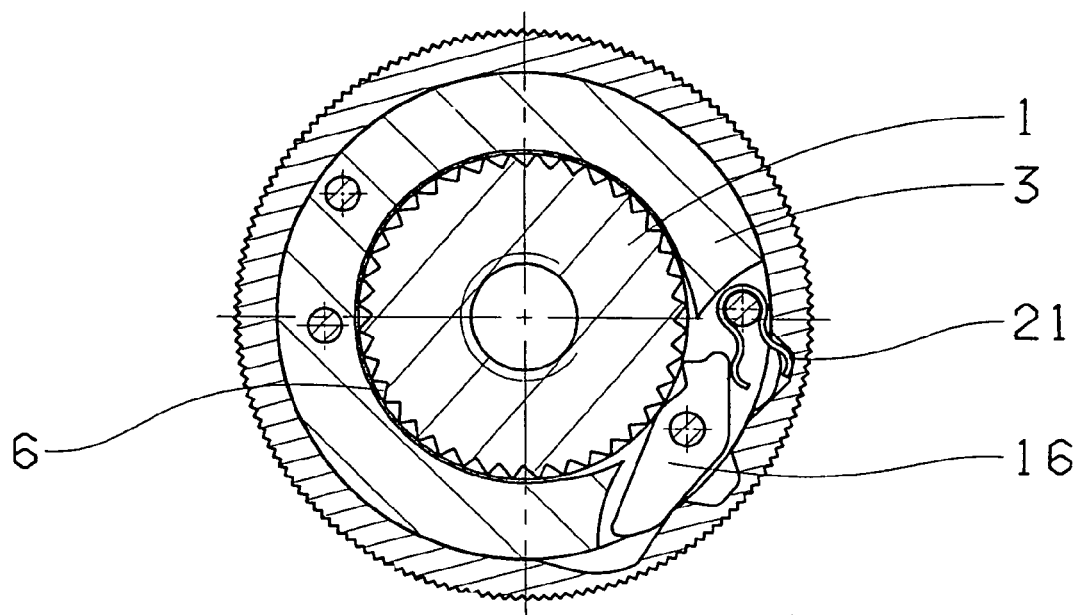
Figure 7:
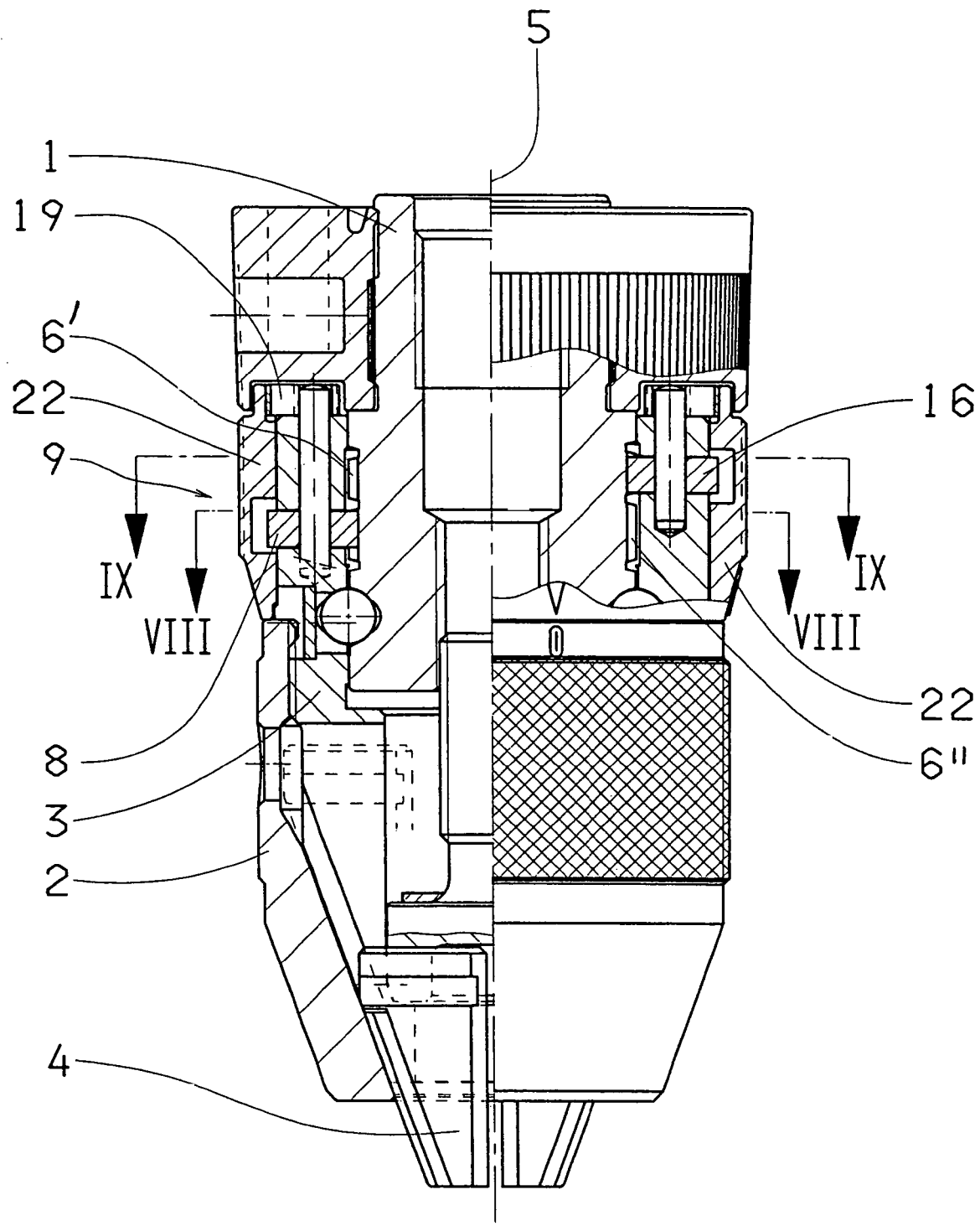
FIG. 7 is a side view partly in axial section through a third embodiment of the chuck according to the invention.
Figure 8A:
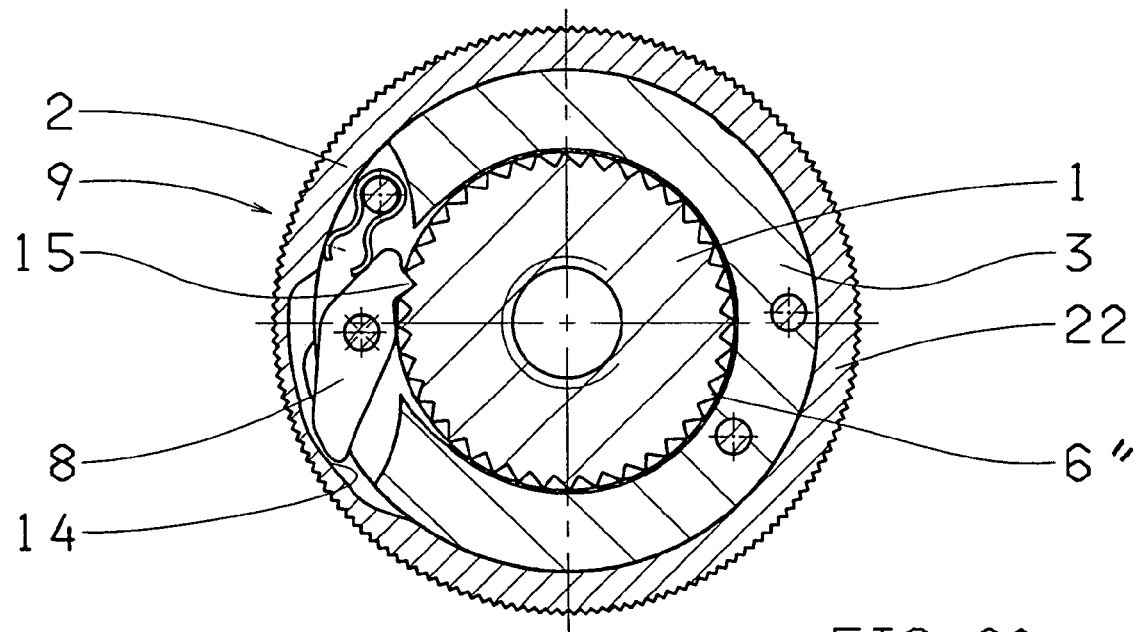
FIGS. 8A and 9A are sections VIII-VIII and IX-IX of FIG. 4 in the first end position with the first pawl in the locking position and the second pawl in the freeing position.
Figure 9A:
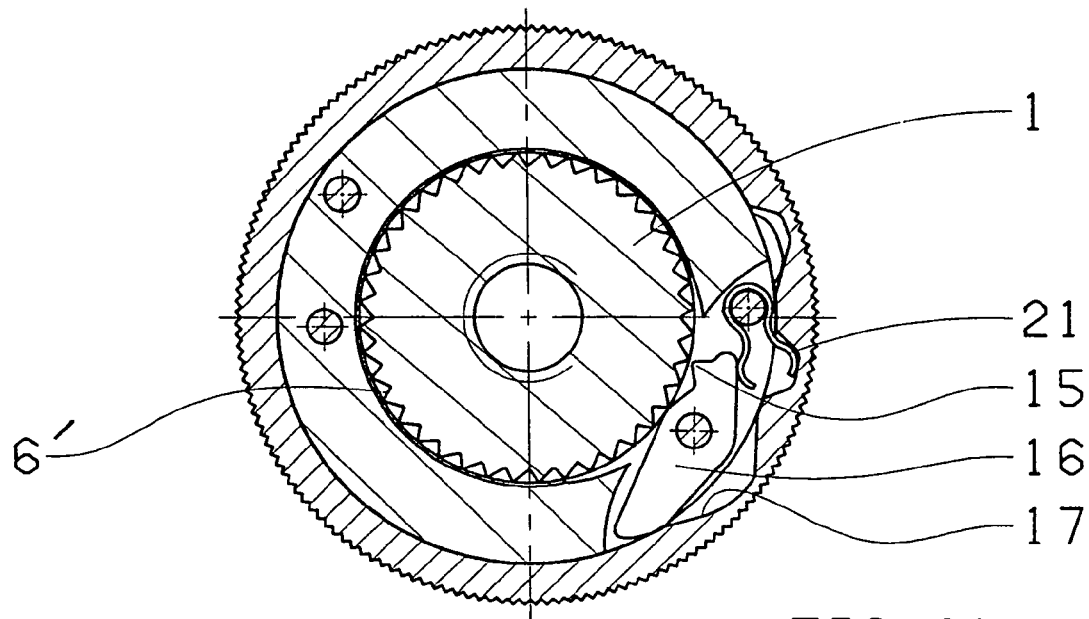
Figure 8B:
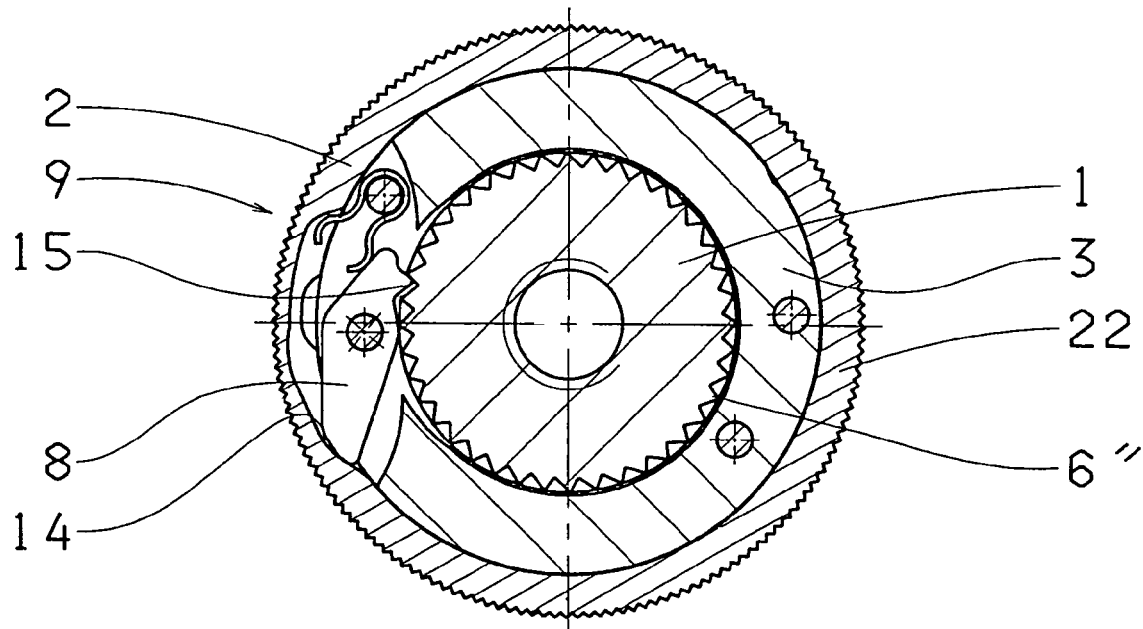
FIGS. 8B and 9B are views like FIGS. 8A and 9A but in the middle position with both pawls in the locking positions.
Figure 9B:
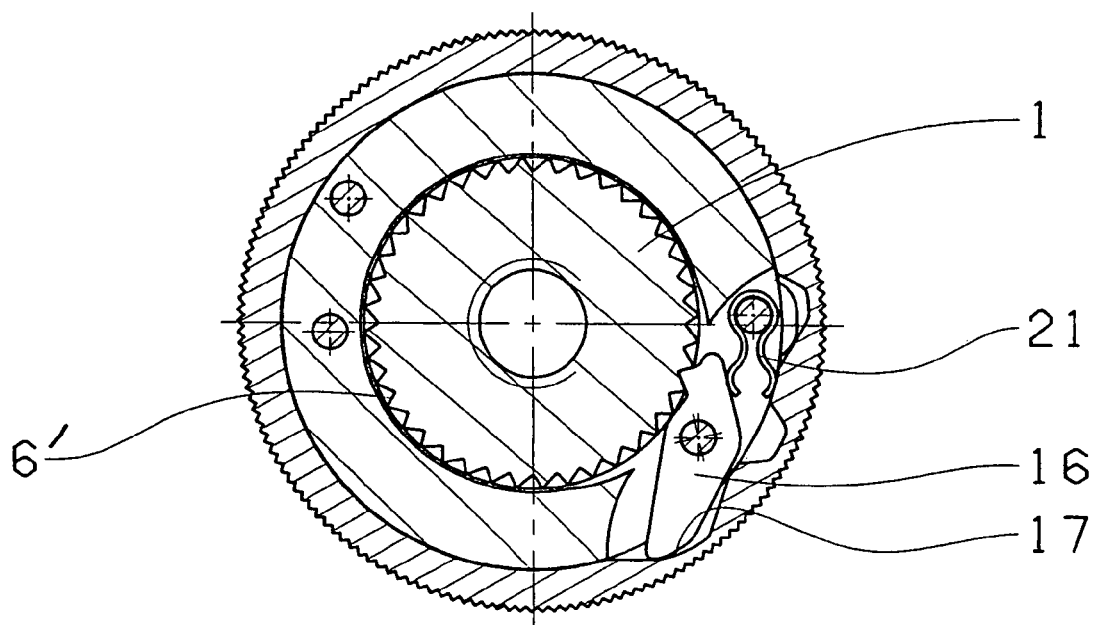
Figure 8C:
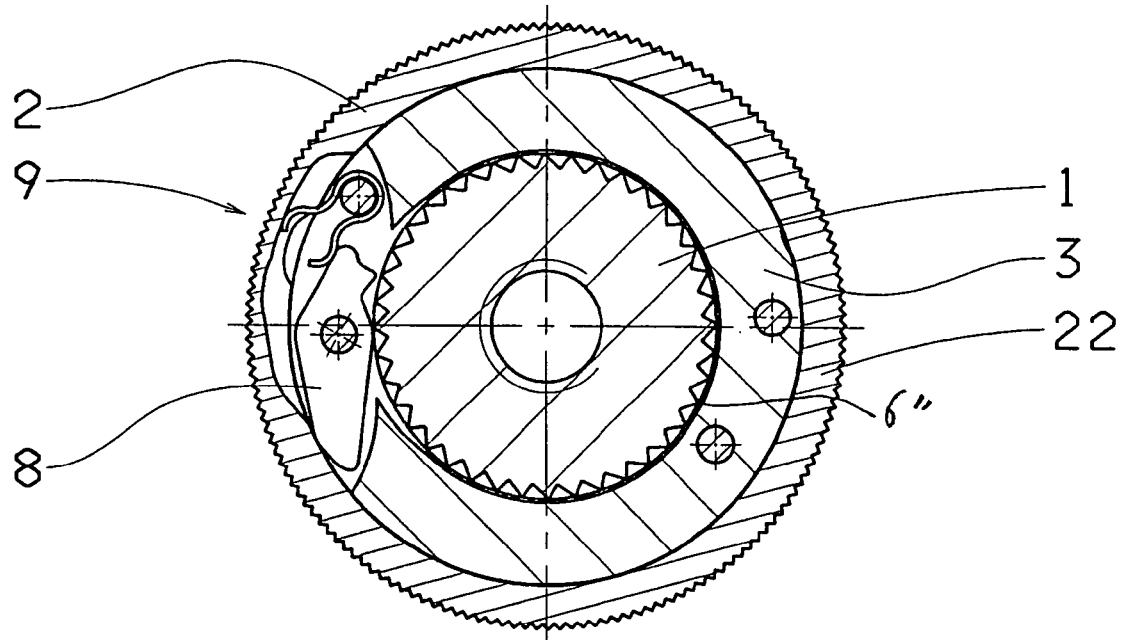
FIGS. 8C and 9C are views like FIGS. 8A and 9A but in the second end position with both pawls in the freeing positions.
Figure 9C:
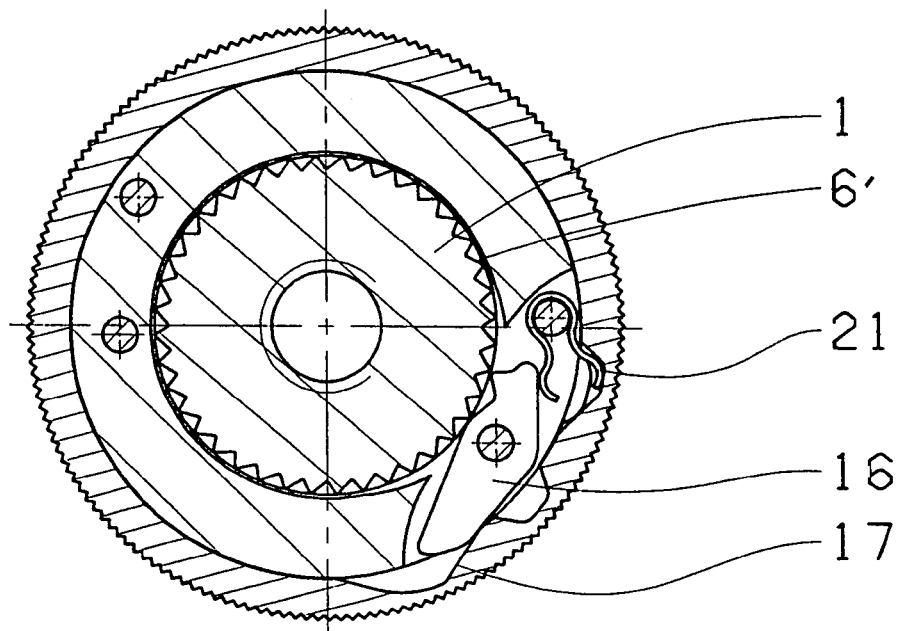
Figure 10:
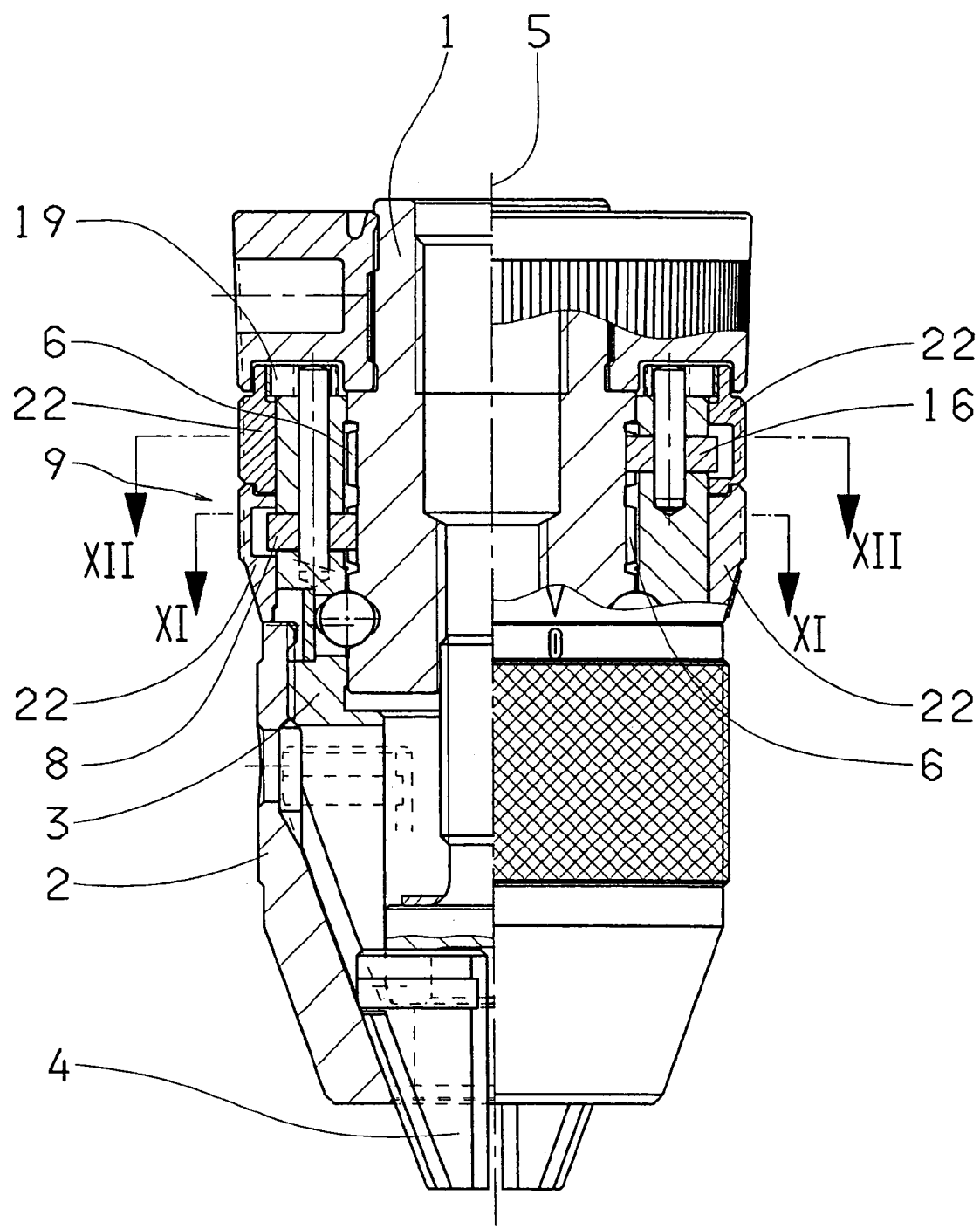
FIG. 10 is a side view partly in axial section through a fourth embodiment of the chuck according to the invention.
Figure 11A:
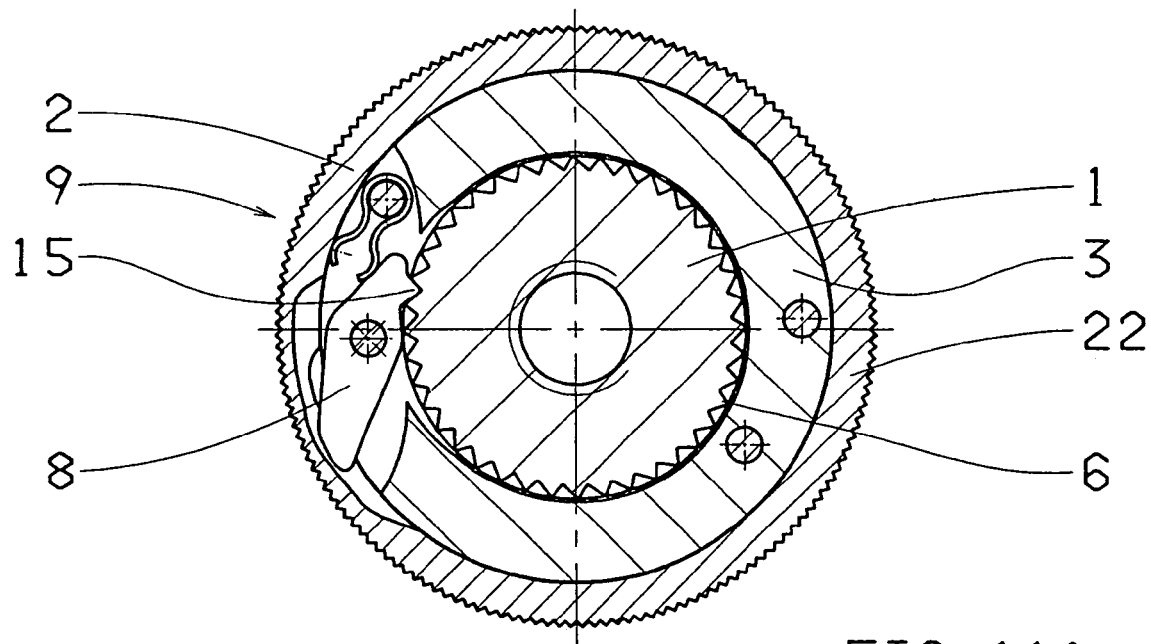
FIGS. 11A and 12A are sections XI-XI and XII-XII of FIG. 10 in the first end position with the first pawl in the locking position and the second pawl in the freeing position.
Figure 12A:
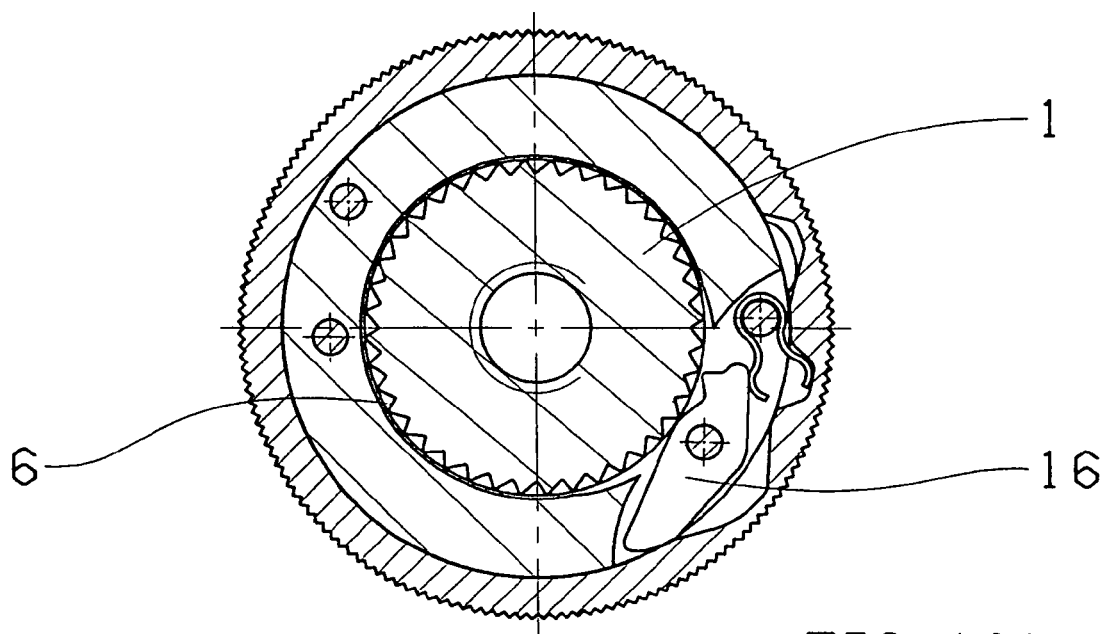
Figure 11B:
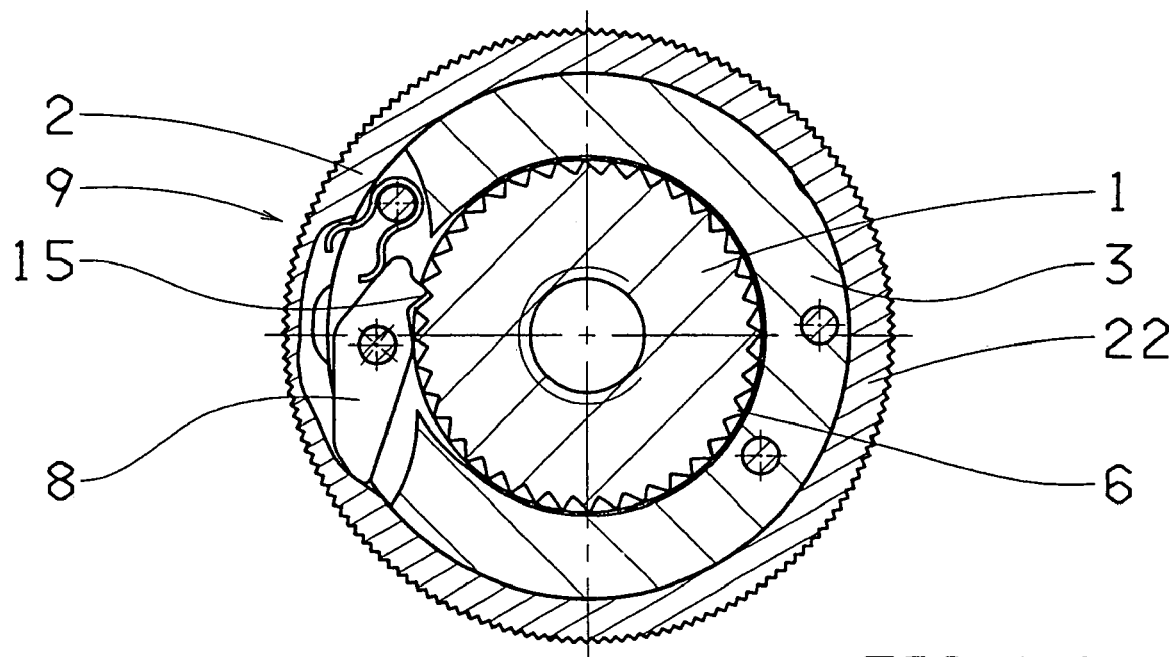
FIGS. 11B and 12B are views like FIGS. 11A and 11B but in the middle position with both pawls in the locking positions.
Figure 12B:
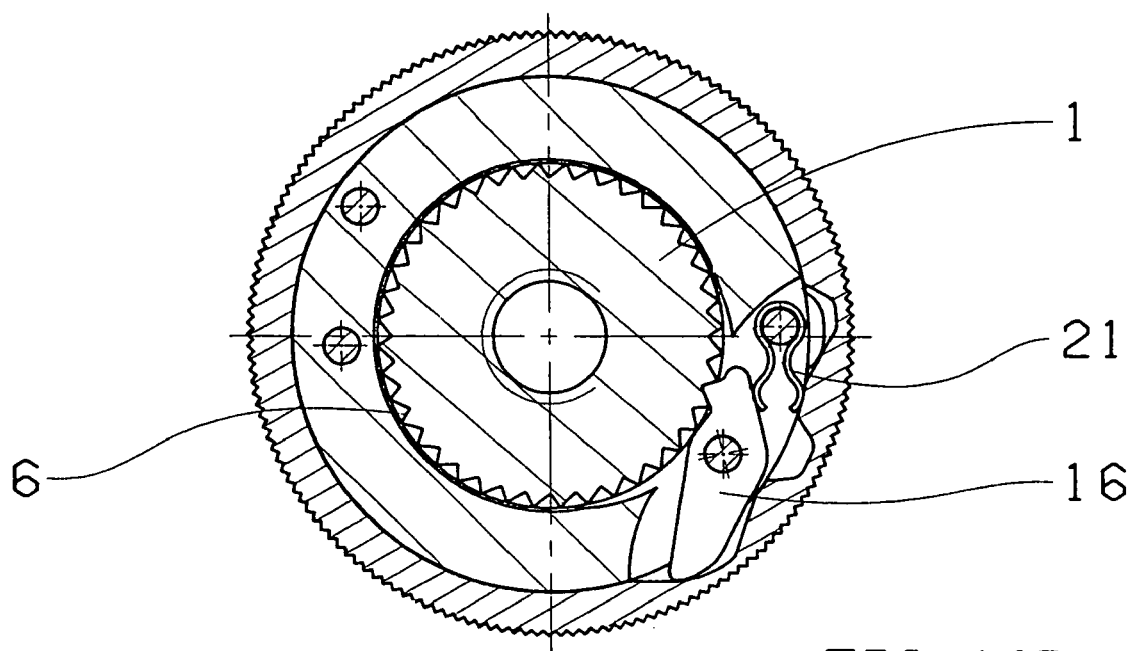
Figure 11C:
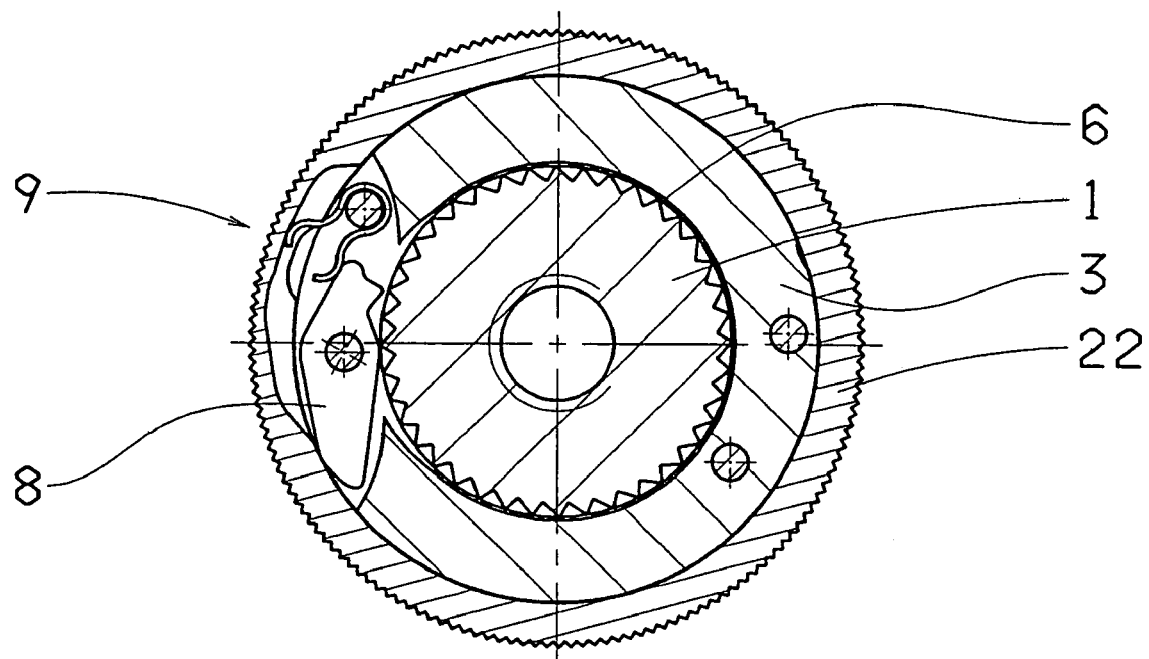
FIGS. 11C and 12C are views like FIGS. 11A and 11B but in the second end position with both pawls in the freeing positions.
Figure 12C:
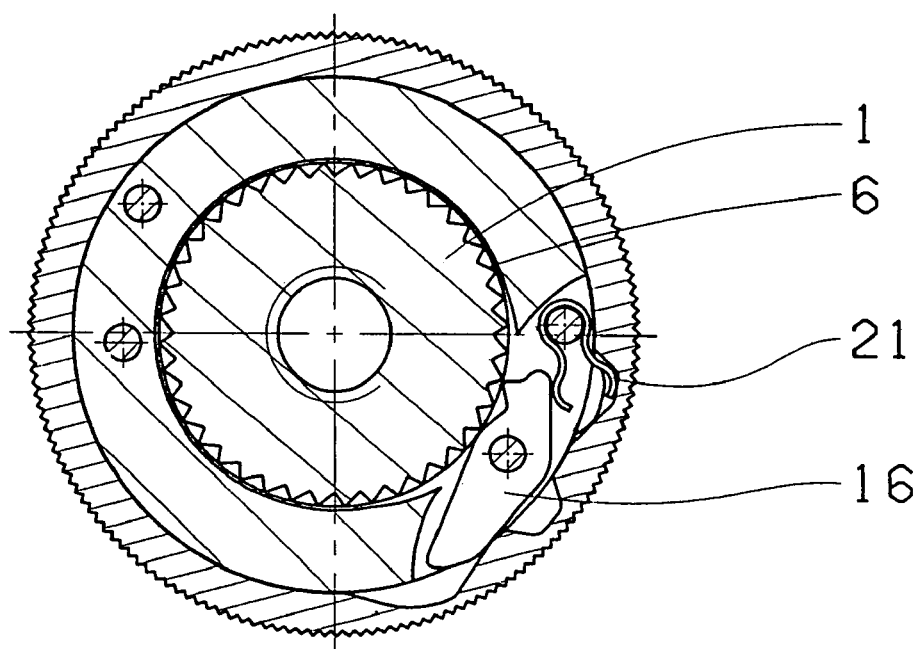
Figure 13:
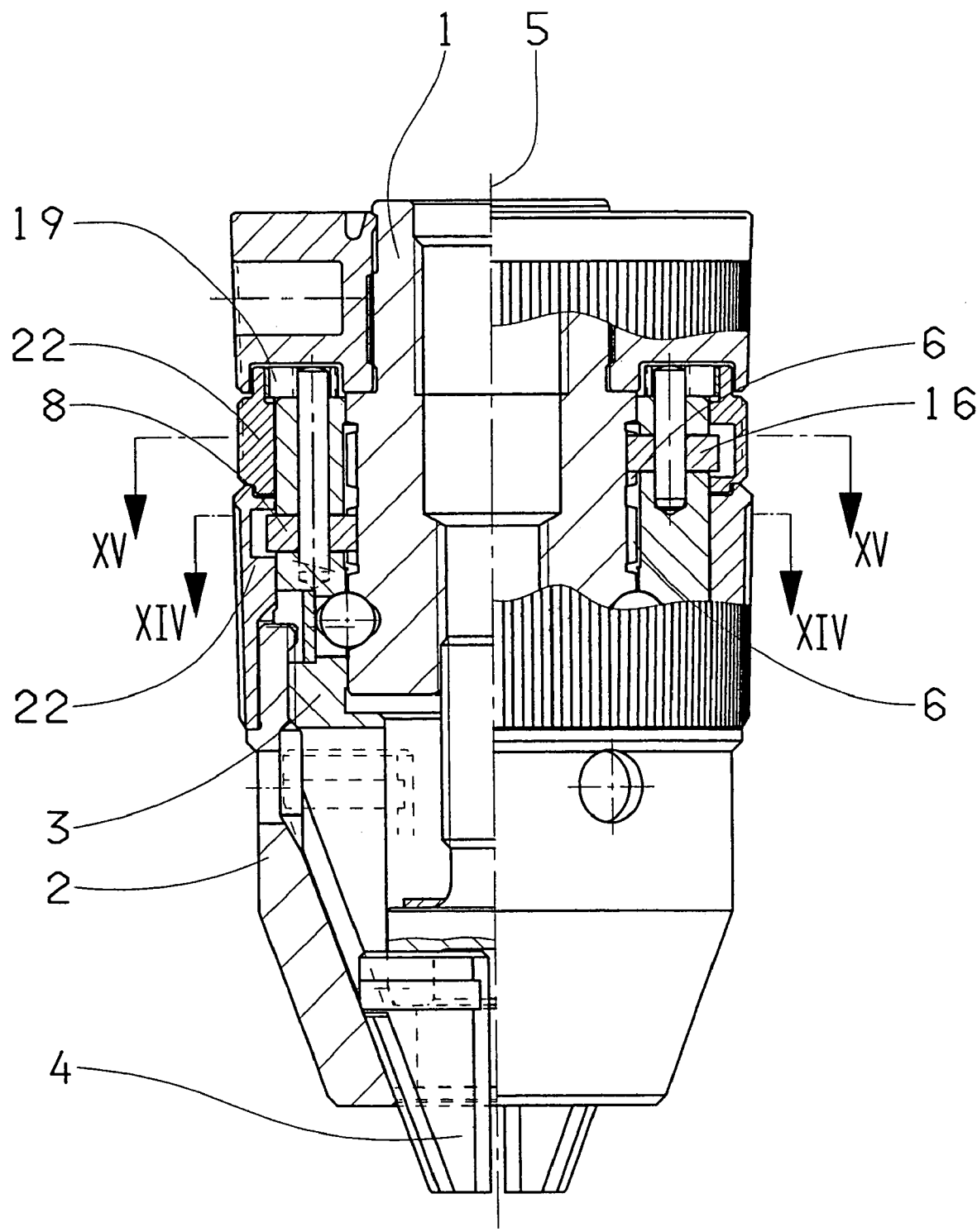
FIG. 13 is a side view partly in axial section through a fifth embodiment of the chuck according to the invention.
Figure 14A:
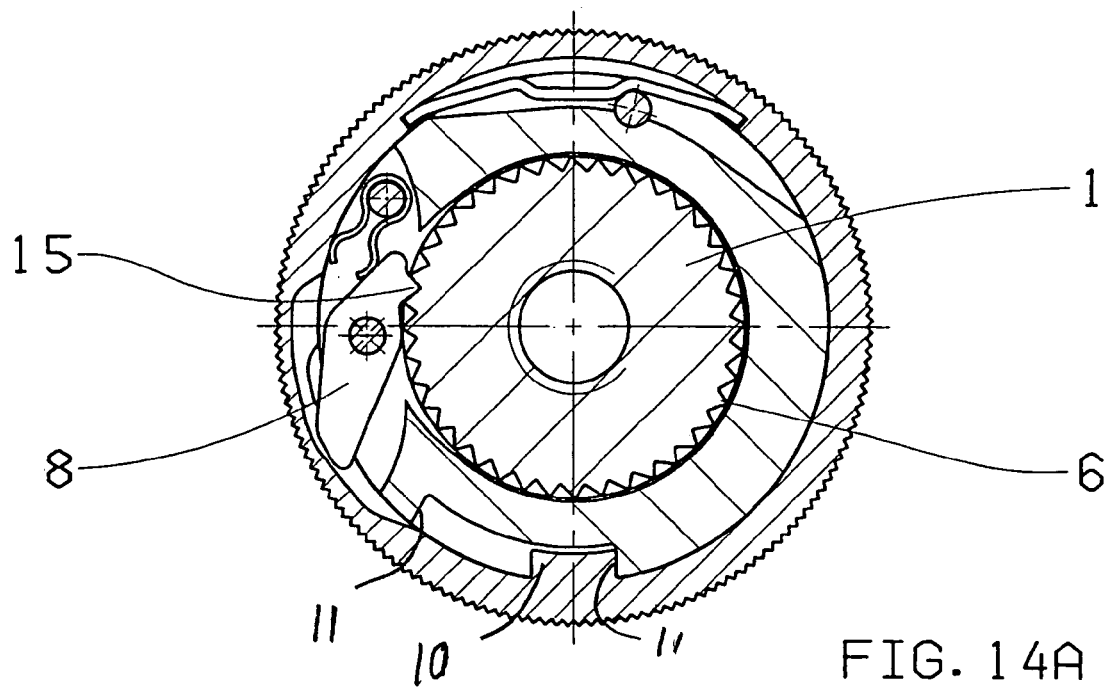
FIGS. 14A and 15A are sections XIV-XIV and XV-XV of FIG. 12 in the middle position with both pawls in the locking positions.
Figure 15A:
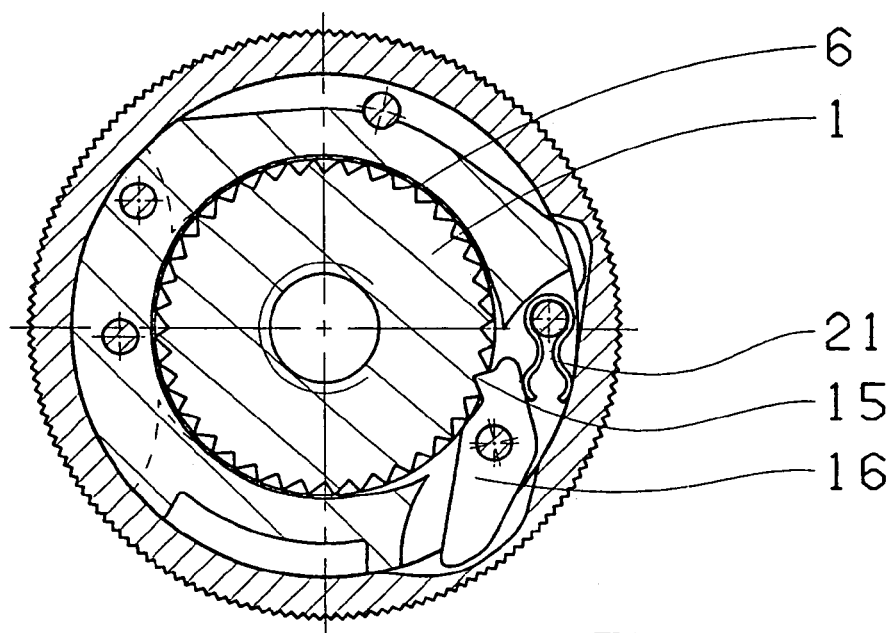
Figure 14B:
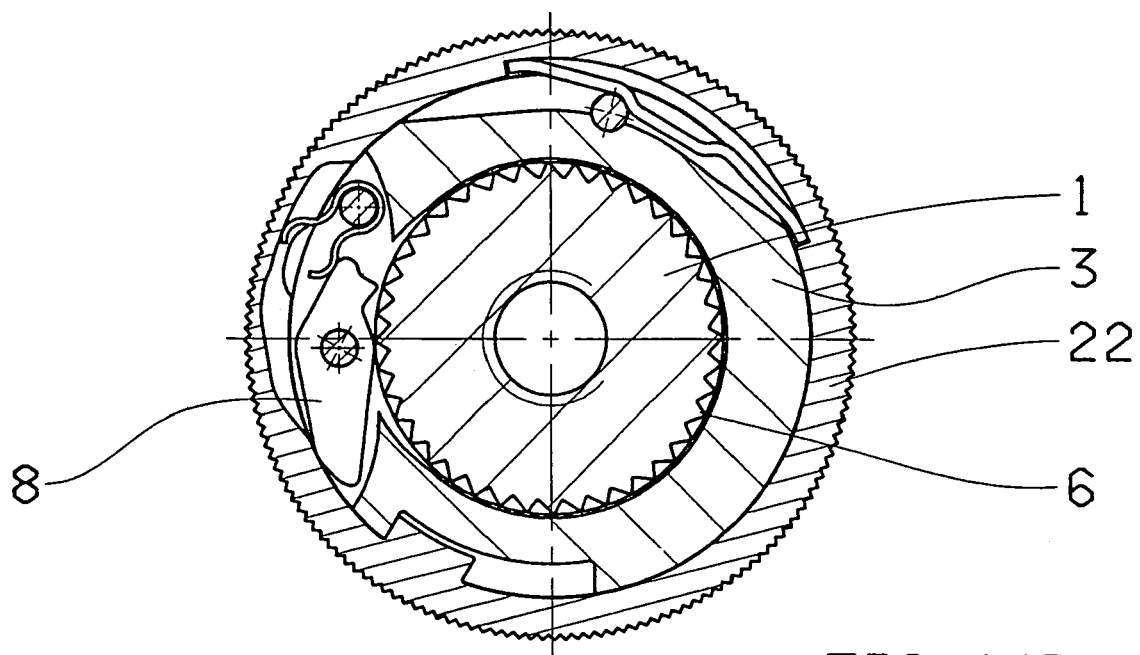
FIGS. 14B and 15B are views like FIGS. 14A and 15A but in the second end position with both pawls in the freeing positions.
Figure 15B:
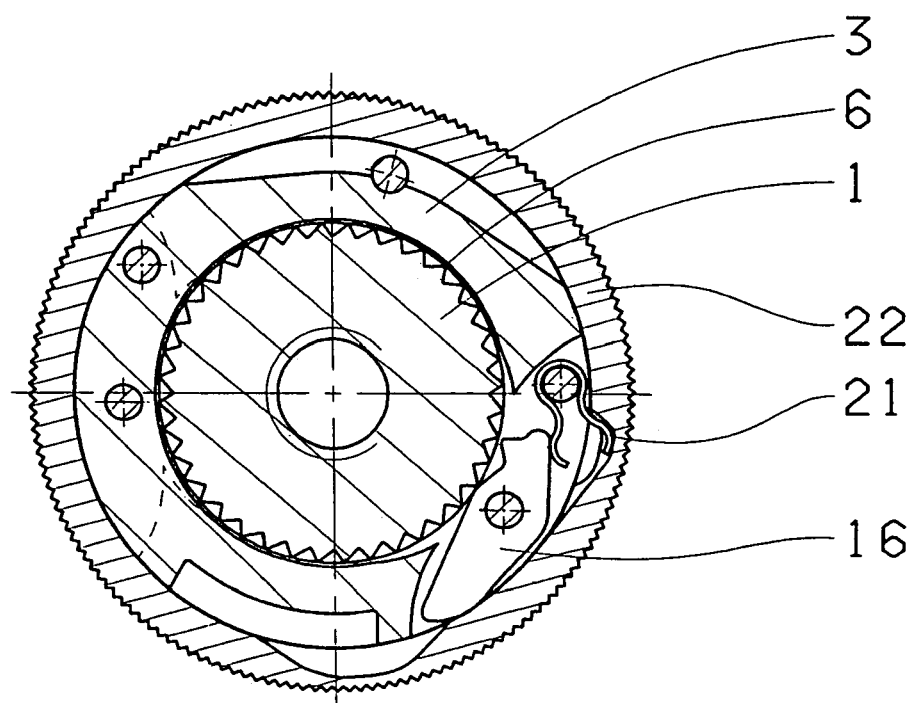

The two pawls 8 and 16 and their cams 14 and 17 are the primary parts of a latch mechanism 9 that can move between the first end position of FIGS. 2A and 3A and the second end position of FIGS. 2C and 3C and through the middle position of FIGS. 2B and 3B. In addition the chuck has a detent 12 formed by a pair of omega-shaped springs 19 mounted on the pins 24, 25, 26, and 27 that form the stops 10 and that also carry the pawls 8 and 16 and springs 7 and 15. These springs 19 each cooperate with three seats 13 so that the chuck is releasably held in the end and middle positions.

To start with the parts are in the first end position of FIGS. 2A and 3A. The pawl 8 is engaged with the teeth 6, the pawl 16 is disengaged from the teeth 6 and the rear stops 10 formed by the pins 25 and 26 are engaged with the counterstops 11 formed by the sleeve 2. Forcible rotation of the sleeve 2 in the tightening direction T will entrain the jaw holder 3 by the interaction of the stops 10 and 11 and the pawl 8 will ratchet around the chuck body 1 that is held stationary by the drill spindle. The jaws 4 will move inward until they grip an unillustrated tool, where the parts will end much as shown in FIGS. 2A and 3A.

From this position the chuck can be used in standard self-tightening mode. Thus back torque applied to the chuck will cause it to self-tighten by rotating the jaw holder 3 in the direction T with ratcheting of the pawl 8 in the teeth 6.

If such self-tightening action is not wanted, the user reverse rotates the sleeve 2, after the chuck has been fully tightened, back in the loosening direction L a small amount, moving the detent springs 19 into the middle seats and shifting the parts into the middle position of FIGS. 2B and 3B. In this position both pawls 8 and 16 are engaged in the teeth 6 and the jaw holder 3 and chuck body 1 cannot rotate relative to each other in either direction T or L. The chuck is locked.

To open or loosen the chuck, the user again grips the sleeve 2 and rotates it further back from the middle position of FIGS. 2B and 3B to the second end position of FIGS. 2C and 3C. In this position both pawls 8 and 16 are pulled off the teeth 6 and the sleeve 2 will entrain the body 3 by engagement of the stops 10 formed by the pins 24 and 27 with the counterstops 11 to open the chuck.

As described in copending application a ring 18 rearwardly closes the chuck, held in place by a snap ring 20 set in the body 1 and formed with radially outwardly open metal-lined blind holes 19. This ring 18 is rotationally coupled via the sleeve 17 to the sleeve 2, so that the entire outside surface of the chuck is formed by these parts 2, 17 and 18 that are rotationally coupled together.

In the second embodiment of FIGS. 4 and 5A-6C, where the above reference numerals are used for functionally identical structure, the primary difference is that the two pawls 8 and 16 are axially offset from one another. To this end the teeth 6 are quite long so that the pawl 8 can engage in the outer region of these teeth 6 and the pawl 16 in the inner region. Otherwise the second embodiment functions identically to the first embodiment.

In the third embodiment of FIGS. 7 and 8A-9*c* the structure is virtually identical to that of FIGS. 4 and 5*a*-6C, but here the chuck body 1 is formed with two axially spaced arrays of teeth 6' and 6". These are oppositely inclined sawteeth so that the ratcheting action over the shallow flanks is particularly smooth and the locking action against the steep flanks is very strong.

The fourth embodiment of FIGS. 10 and 11A-12C is identical to the third embodiment, but here the ring 22' can rotate independently of the sleeve 2. This ring 22' operates the first pawl 8 while the sleeve 2 operates the second pawl 16, allowing them to be operated independently of each other.

In the fifth embodiment of FIGS. 13 and 14A-15B there is common actuation of the jaw holder 3 and the one release ring 22 associated with the first pawl 8.

I claim:
1. A drill chuck comprising:
a chuck body centered on and rotatable about an axis;
a jaw holder rotatable on the body and formed with a plurality of angularly spaced guides;
a sleeve surrounding the holder and body;
respective jaws in the guides between the sleeve and the body;
means for shifting the jaws in the guides forward and together on rotation of the holder in a tightening direction relative to the body and for opposite shifting of the jaws on rotation of the holder relative to the body in an opposite loosening direction;
interengaging first and second stops on the body engageable with the sleeve and limiting relative angular movement of the sleeve on the body between respective angularly offset first and second end positions;
an annular array of teeth rotationally fixed to the chuck body;
a first pawl angularly fixed on the holder and engageable with the teeth, the pawl and the array of teeth being oriented such that when the pawl is in a locking position engaged with the array of teeth the holder can rotate relative to the body in the tightening direction but not in the loosening direction and when in a freeing position disengaged from the teeth the holder can rotate freely in either direction relative to the body;
a second pawl angularly fixed on the holder and engageable with the teeth, the second pawl and the array of teeth being oriented such that when the second pawl is in a locking position engaged with the array of teeth the holder can rotate relative to the body in the loosening direction but not in the tightening direction and when in a freeing position disengaged from the teeth the holder can rotate freely in either direction relative to the body;
respective first and second spring means for urging the first and second pawls into the locking positions; and
means between the sleeve and the pawls for
in the first end position displacing the first pawl into the locking position and the second pawl into the freeing position, in a middle position between the end positions displacing the second pawl into the locking position and the first pawl into the freeing position, and in the second end position displacing both the pawls into the respective freeing positions.

2. The drill chuck defined in claim 1 wherein the means between the sleeve and the pawls includes first and second cam formations on the sleeve engageable with the first and second pawls.

3. The drill chuck defined in claim 2 wherein the first end position corresponds to a position assumed by the sleeve when rotated in the tightening direction relative to the chuck body against the first stop and the second end position corresponds to a position assumed by the sleeve when rotated in the loosening direction relative to the chuck body against the second stop.

4. The drill chuck defined in claim 1, further comprising detent means between the sleeve and the jaw holder for releasably retaining the sleeve in the end positions.

5. The drill chuck defined in claim 4 wherein the detent means also retains the sleeve in the middle position.

6. The drill chuck defined in claim 5 wherein the detent means includes a radially deflectable spring and a plurality of angularly offset radially open seats in which the spring is engageable.

7. The drill chuck defined in claim 1 wherein the pawls are mounted on the jaw holder generally diametrally opposite each other.

8. The drill chuck defined in claim 7 wherein the pawls are pivoted about respective axes generally parallel to and diametrally flanking the chuck-body axis.

9. The drill chuck defined in claim 8 wherein the pawls lie in a common plane perpendicular to the axes.

10. The drill chuck defined in claim 8 wherein the pawls are axially offset from each other.

11. The drill chuck defined in claim 10 wherein the teeth extend axially sufficiently that both pawls can engage them.

12. The drill chuck defined in claim 10 wherein there are two such arrays of teeth, one for each pawl 13. The drill chuck defined in claim 1 wherein each of the pawls is centrally pivoted on the jaw holder and has one end engageable with the teeth and an opposite end engageable with the means.

14. The drill chuck defined in claim 13 wherein the first and second springs engage the one ends of the pawls.

15. The drill chuck defined in claim 1 wherein the teeth are formed on the chuck body.

16. The drill chuck defined in claim 1 wherein the sleeve includes a release ring formed with the means.

\* \* \* \* \*